(12) United States Patent
Martin

(10) Patent No.: US 10,011,143 B2
(45) Date of Patent: Jul. 3, 2018

(54) PANELS WITH TRANSITION SURFACE FEATURE AND ASSEMBLIES AND METHODS INCORPORATING THE SAME

(71) Applicant: 3form, LLC, Salt Lake City, UT (US)

(72) Inventor: Guillaume Martin, Rochetoirin (FR)

(73) Assignee: 3FORM, LLC, Salt Lake City, UT (US)

( * ) Notice: Subject to any disclaimer, the term of this patent is extended or adjusted under 35 U.S.C. 154(b) by 35 days.

(21) Appl. No.: 15/064,860

(22) Filed: Mar. 9, 2016

(65) Prior Publication Data

US 2016/0265237 A1    Sep. 15, 2016

Related U.S. Application Data

(60) Provisional application No. 62/130,721, filed on Mar. 10, 2015.

(51) Int. Cl.
| | |
|---|---|
| *E04F 19/00* | (2006.01) |
| *B44C 1/00* | (2006.01) |
| *E04F 13/08* | (2006.01) |
| *B44C 5/04* | (2006.01) |
| *B60J 9/00* | (2006.01) |

(52) U.S. Cl.
CPC .............. *B44C 1/00* (2013.01); *B44C 5/04* (2013.01); *E04F 13/0871* (2013.01); *B60J 9/00* (2013.01); *Y10T 428/24355* (2015.01)

(58) Field of Classification Search
None
See application file for complete search history.

(56) References Cited

U.S. PATENT DOCUMENTS

| | | | | |
|---|---|---|---|---|
| 7,159,914 B2* | 1/2007 | Svenson | ................. | B60R 13/02 428/31 |
| 2004/0200164 A1* | 10/2004 | Schrunk | .................... | B44F 1/10 52/311.1 |
| 2012/0052243 A1* | 3/2012 | Kato | ....................... | B60R 13/02 428/141 |

* cited by examiner

*Primary Examiner* — David Sample
*Assistant Examiner* — Donald M Flores, Jr.
(74) *Attorney, Agent, or Firm* — Workman Nydegger

(57) ABSTRACT

Panels and panel assemblies include one or more transition surface features that comprise or provide a transition gradient between a first surface feature and a second surface feature. Surface feature types include surface texturing, coloring, decoration, and so forth. Transition gradients progressively change one or more attributes of the surface feature across the panel surface. Transition surface features begin at a first degree of the attribute at an origin, such as a point, line, or area of the panel or panel assembly, and transition to a different degree while moving away from the origin. Panel assemblies include a non-transitioning panel having a first surface feature type, a non-transitioning panel having a second surface feature type, and a transitioning panel disposed between the non-transitioning panels and having a transition surface feature that provides a transition gradient between the first surface feature type and a second surface feature type.

8 Claims, 11 Drawing Sheets

PANELS WITH TRANSITION SURFACE FEATURE AND ASSEMBLIES AND METHODS INCORPORATING THE SAME

CROSS-REFERENCE TO RELATED APPLICATIONS

The present application claims the benefit of priority to U.S. Provisional Application No. 62/130,721, filed Mar. 10, 2015, entitled "TRANSITION EFFECT PANELS, ASSEMBLIES, AND METHODS," the entire contents of which is incorporated herein by specific reference.

BACKGROUND

1. Technical Field

This disclosure relates to architectural panels and panel assemblies, and to systems, methods, and devices incorporating the same as decorative or functional elements in a building space.

2. Relevant Technology

Recent trends in building design involve adding to the functional and/or aesthetic characteristics of a given structure or design space by adding (e.g., mounting or placing) one or more architectural panels thereto. Such panels (or set of panels) can enhance the architectural and aesthetic appeal or provide increased design flexibility, as compared to the original structure. For instance, architectural panels may be used to provide or replace conventional walls, backdrops, barriers, or partitions, or to provide surface treatments for the same, in order to adjust or improve the functional and/or aesthetic characteristics of the space.

Architectural panels may also include a display surface profile (or design), such as surface texturing or pattern, to further enhance the aesthetics of the design space. Like conventional walls, the surface profile is applied across the entire display surface of the panel in a uniform or consistent manner. In addition, panels provided or utilized in sets of two or more are manufactured with the same uniform surface profile to provide a generally consistent surface display feature across the panel surfaces. Other panel systems may provide variety to the design space by adding panels of different uniform surface display features.

Such conventional panels and panel assemblies suffer from a number of drawbacks. For example, a single panel with uniform surface features lacks the variety that some users may desire in a given implementation. Though a user can attempt to provide the desired variety through other decorative means, such as artwork, lighting fixtures, etc., spatial, functional and/or aesthetic design constraints may limit or even prohibit the addition of variety-enhancing decorative means. Additionally, the use of multiple panels, each with a different, but uniform surface feature, or the use of multiple panels with different, non-related surface features, can highlight the abrupt border where two or more of the panels align in the design space, because the different surface features do not relate to each other in any particular way. Such dramatic and abrupt transitions between adjacent panels may be aesthetically and/or functionally undesirable in certain design spaces.

Accordingly, there are a number of disadvantages in conventional architectural panels and panel assemblies that can be addressed.

BRIEF SUMMARY

Implementations of the present disclosure include architectural panels and panel assemblies, and systems, methods, and devices incorporating the same as decorative or functional elements in a building space. The panels provide a transition or transitioning surface feature and/or a progressively changing, non-abrupt surface effect. For example, one or more implementations of the present disclosure include an architectural panel including a front surface and a transition surface feature disposed on at least a portion of the front surface. The transition surface feature is configured to progressively change (e.g., transition or fade) from a first design state at a first section of the panel (or front surface thereof) to a second design state at a second section of the panel (or front surface thereof) by passing through at least one design transition gradient.

Some implementations include a multi-panel architectural assembly including a first panel having a first surface feature type and a second panel having a second surface feature type. One or more of the first or second surface feature types can comprise a transition surface feature configured to progressively change from the first surface feature type to the second surface feature type by passing through a transition gradient.

Some implementations include a first panel having a first surface feature type, a second panel having a second surface feature type, and a transition panel positionable between the first and second panels and having a transition surface feature configured to progressively change from the first surface feature type to the second surface feature type by passing through a transition gradient.

Some implementations include a multi-panel architectural assembly including a first panel having a first surface feature type, a second panel having a second surface feature type, a third panel having a third surface feature type, a first transition panel positionable between the first and second panels, and a second transition panel positionable between the first and third panels, the first transition panel having a transition surface feature configured to progressively change from the first surface feature type to the second surface feature type by passing through a transition gradient, and the second transition panel having a transition surface feature configured to progressively change from the first surface feature type to the third surface feature type by passing through a transition gradient. In some implementations, the second surface feature type and the third surface feature type are the same.

Some implementations include a method of assembling an architectural panel assembly including positioning a first panel having a first surface feature type, positioning a second panel having a second surface feature type, and positioning a transition panel between the first and second panels, the transition panel having a transition surface feature configured to provide a progressive transition from the first surface feature type to the second surface feature type through a transition gradient.

Additional features and advantages of the implementations of the present disclosure will be set forth in the description which follows or may be learned by the practice of such implementations. The features and advantages of such implementations may be realized and obtained by means of the instruments and combinations particularly pointed out in the appended claims. These and other features will become more fully apparent from the following description and appended claims, or may be learned by the practice of such implementations as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific implementations thereof which are illustrated in the appended drawings. Understanding that these drawings depict only typical implementations of the disclosure and are not therefore to be considered to be limiting of its scope, the disclosure will be described and explained with additional specificity and detail through the use of the accompanying drawings in which.

DETAILED DESCRIPTION

Figure 1:
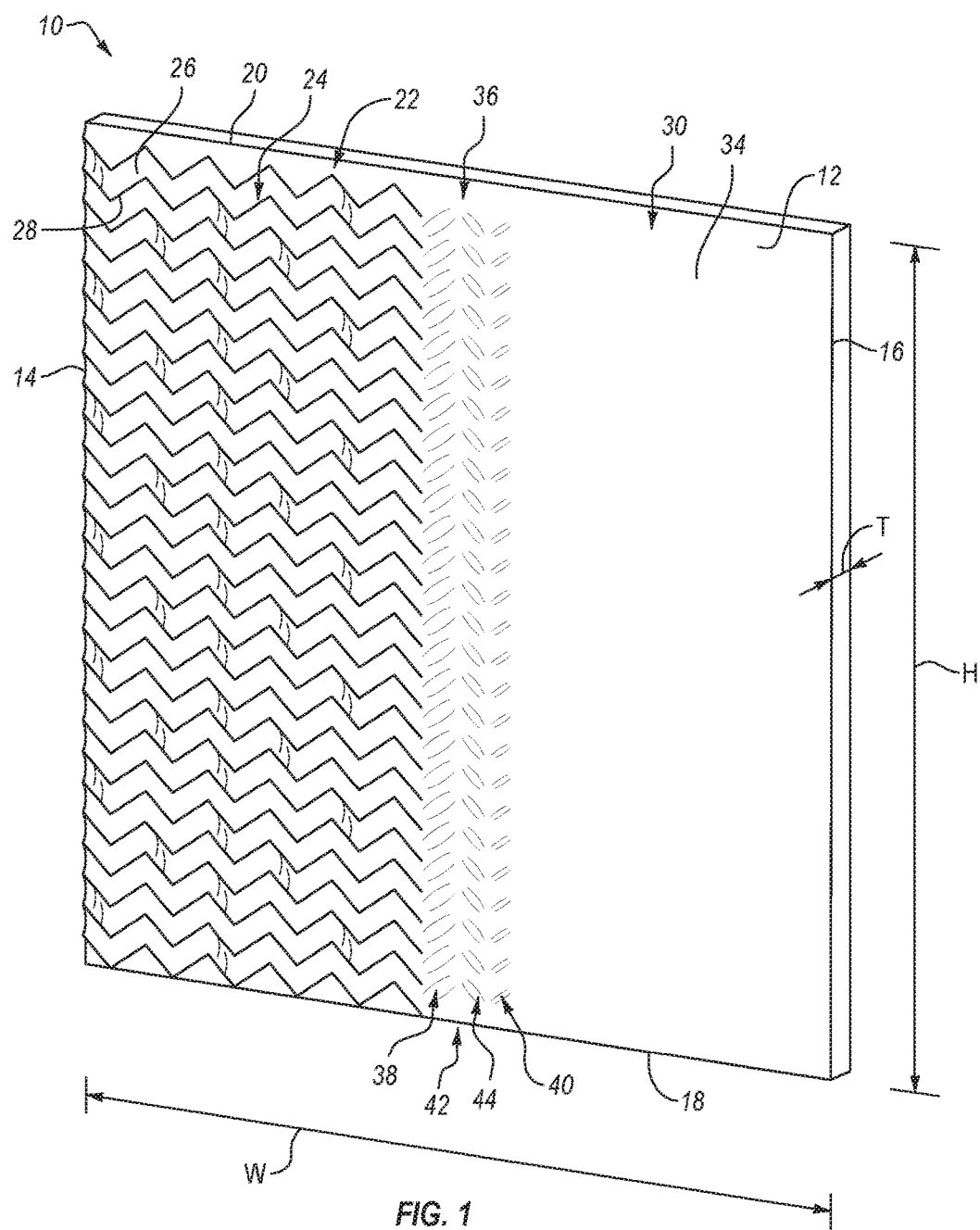
FIGS. 1-3 each illustrates a perspective view of a panel having a transition surface feature in accordance with an implementation of the present disclosure.

Conventional architectural panels typically include a uniform or consistent surface profile (or design) across the entire display surface of the panel. Such panels suffer from a lack of decorative variety that is often desirable in a design space. Variety can be achieved by assembling together panels having different surface display features, but the difference between the surface features of adjacent panels can highlight the abrupt borders or edges of the panels. Implementations of the present disclosure, however, can provide a progressive transition surface feature and/or a progressively changing, non-abrupt surface effect that reduces abrupt surface changes within the display surface of a single panel or between display surfaces or different panels.

Before describing the present disclosure in further detail, it is to be understood that this disclosure is not limited to the description of the particularly exemplified systems, methods, and/or products that may vary from one implementation to the next. Thus, while certain implementations of the present disclosure will be described in detail, with reference to specific configurations, parameters, features (e.g., components, members, elements, parts, and/or portions), etc., the descriptions are illustrative and are not to be construed as limiting the scope of the claimed invention. In addition, the terminology used herein is for the purpose of describing the implementations, and is not necessarily intended to limit the scope of the claimed invention.

Unless defined otherwise, all technical and scientific terms used herein have the same meaning as commonly understood by one of ordinary skill in the art to which the present disclosure pertains.

Various aspects of the present disclosure, including systems, processes, and/or products may be illustrated with reference to one or more embodiments or implementations, which are exemplary in nature. As used herein, the terms "embodiment" and "implementation" mean serving as an example, instance, or illustration, and should not necessarily be construed as preferred or advantageous over other aspects disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description. The term "systems" also contemplates devices, apparatus, compositions, assemblies, kits, and so forth. Similarly, the term "method" also contemplates processes, procedures, steps, and so forth. Moreover, the term "products" also contemplates devices, apparatus, compositions, assemblies, kits, and so forth.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

It will be noted that, as used in this specification and the appended claims, the singular forms "a," "an" and "the" include plural referents unless the context clearly dictates otherwise. Thus, for example, reference to a "panel" includes one, two, or more panels. Similarly, reference to a plurality of referents should be interpreted as comprising a single referent and/or a plurality of referents unless the content and/or context clearly dictate otherwise. Thus, reference to "panels" does not necessarily require a plurality of such panels. Instead, it will be appreciated that independent of conjugation; one or more panels are contemplated herein.

As used herein, directional, positional, and/or orientational terms, such as "top," "bottom," "left," "right," "up," "down," "upper," "lower," "inner," "outer," "internal," "external," "interior," "exterior," "proximal," "distal" and so forth can be used arbitrarily and/or solely to indicate relative directions, positions, and/or orientations and may not be otherwise intended to limit the scope of the disclosure, including the specification, drawings, and/or claims.

Various aspects of the present disclosure can be illustrated by describing components that are bound, coupled, attached, connected, and/or joined together. As used herein, the terms "bound," "coupled", "attached", "connected," and/or "joined" are used to indicate either a direct association between two components or, where appropriate, an indirect association with one another through intervening or intermediate components. In contrast, when a component is referred to as being "directly bound," "directly coupled", "directly attached", "directly connected," and/or "directly joined" to another component, no intervening elements are present or contemplated.

To facilitate understanding, like references (i.e., like naming of components and/or elements) have been used, where possible, to designate like elements common to the figures. Specifically, in the exemplary implementations illustrated in the figures, like structures, or structures with like functions, will be provided with similar reference designations, where possible. Specific language will be used herein to describe the exemplary implementations. Nevertheless it will be understood that no limitation of the scope of the disclosure is thereby intended. Rather, it is to be understood that the language used to describe the exemplary implementations is illustrative only and is not to be construed as limiting the scope of the disclosure (unless such language is expressly described herein as essential).

It will also be appreciated that where multiple possibilities of values or a range of values (e.g., less than, greater than, at least, and/or up to a certain value, and/or between two recited values) is disclosed or recited, any specific value or range of values falling within the disclosed range of values is likewise disclosed and contemplated herein. Thus, disclosure of an illustrative measurement or amount less than or equal to about 10 units or between 0 and 10 units includes, illustratively, a specific disclosure of: (i) a measurement or amount of 9 units, 5 units, 1 units, or any other value between 0 and 10 units, including 0 units and/or 10 units; and/or (ii) a measurement or amount between 9 units and 1 units, between 8 units and 2 units, between 6 units and 4 units, and/or any other range of values between 0 and 10 units.

The headings used herein are for organizational purposes only and are not meant to be used to limit the scope of the description or the claims.

Implementations of the present disclosure include panels and panel assemblies configured to provide a transitioning surface feature across at least a portion of one or more panels. Implementations also include methods of assembling and/or using a panel and/or panel assembly including such a transitioning surface feature.

As used herein, the terms "panel" and "panel assembly" include architectural and/or decorative material which can be used as partitions, walls, backdrops, barriers, décor, signs, floors, ceilings, and other structures, and can be used in offices, homes, lobbies, stores, displays, and other settings, whether indoor or outdoor. Panel materials can include plastic, glass, wood, composites, metal, polymeric, resin, or other materials or combinations of materials.

As used herein, "polymeric" materials include, but are not limited to, materials formed of any one or more of the following (thermoplastic) polymers (or alloys thereof): polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), acrylics, or the like. Furthermore, polymeric materials can include other (thermoplastic) polymers or (thermoplastic) polymer blends, or combinations and mixtures thereof. In addition, any given polymeric material can include one or more polymeric layers (or sheets) and/or coatings. Polymeric materials can be opaque or non-opaque (e.g., transparent or translucent).

As used herein, the terms "transition surface feature," "transition surface," "transition feature," and similar terms refer to a surface-perceivable design feature (or design feature applied or disposed on a surface) of a panel or assembly of panels that progressively changes from one characteristic or type to another. The design feature can comprise or be formed by surface texturing (such as a recess into and/or protrusion extending from the surface of the panel), surface coloring (such as a film overlay, printed color, etc.), and/or surface decoration (such as design patterns, objects, shading, etc.). In alternative implementations, the design feature can be surface-perceivable, but not surface-disposed. For instance, the design feature can be or comprise a sub-surface texturing, coloring, or decoration.

The changing characteristic of the design feature can include any (progressively) transitionable attribute thereof, including the quantity, density, complexity, detail, intensity, frequency, regularity, and/or other (measurable) attribute of the design feature. For instance, in some implementations, the design feature can comprise surface texturing. The progressively changing characteristic of the surface texturing can include, for example, recess depth or length, protrusion height or length, proportionality (e.g., proportion of texturized surface area to non-texturized surface area or to differently texturized surface area), or the degree (e.g., amount or level) of any suitable attribute of the surface texturing. The design feature (e.g., (surface) texturing, coloring, or decoration) can also form a pattern or design, characteristics of which can be modified (e.g., progressively) to alter the appearance of the surface detail. Such characteristics can also be measurable.

One or more implementations include an architectural panel including a front surface and a transition surface feature disposed on at least a portion of the front surface. The front surface (or portion(s) thereof) can be substantially planar and/or non-planar. The transition surface feature is configured to progressively change (e.g., transition or fade) from a first design state at a first section of the panel (or front surface thereof) to a second design state at a second section of the panel (or front surface thereof) by passing through at least one design transition gradient. Illustratively, the first design state (in the first section of the panel or panel surface) can comprise a first surface feature, such as surface texturing, with one or more of the above measurable characteristics. The second design state (in the second section of the panel or panel surface) can comprise a second surface feature and/or can be substantially devoid of the first surface feature. For instance, the second design state can include a substantially blank (or untextured) surface that is substantially devoid of surface texturing or a (first) surface feature. Alternatively, the second design state can include a second surface feature that is different from the first surface feature.

It will also be appreciated that an opposing back surface of the panel (or assembly of panels) can also include a transition surface feature in some implementations.

The transition surface feature progressively changes (e.g., transitions or fades) from the first design state (or feature) to the second design state (or feature) by means of a transition gradient. The transition gradient can reduce the presence (or prevalence) of the first design feature, while increasing the presence (or prevalence) of the second design feature, over an intermediate section of the panel. For instance, a transition gradient for (surface) texturing can include, for example, gradually and/or progressively decreasing the depth (or length) of texturing recesses over or across the intermediate section of the panel. Similarly, a transition gradient for coloring can include, for example, gradually and/or progressively decreasing the intensity, brightness, contrast, or other property of the color over or across the intermediate section of the panel. Likewise, a transition gradient for a decoration can include, for example, gradually and/or progressively decreasing the number, density, frequency, or other property of the decoration over or across the intermediate section of the panel.

For convenience, portions of this disclosure may refer specifically to (surface) texturing. It will be appreciated, however, that reference to (surface) texturing can include and/or incorporates all types of design states and/or features, such as coloring, decoration, and so forth.

Various implementations of the present disclosure include surface texturing as a design feature. Surface texturing can comprise alterations in the level (height, depth, etc.) of the front surface of the panel. In some implementations, the texturing can comprise (or occur in the form of) dips, pits, troughs, trenches, waves, valleys, scoring, scraping, shapes, patterns, or any other form of recess or material removal. In some implementations, the texturing can comprise (or occur in the form of) specs, dots, bumps, waves, mounds, pillars, spires, peaks, plateaus, or any other form of deposit or raised material. An illustrative transition gradient of such texturing can comprise the gradual and/or progressive decreasing of the texturing depth or height (e.g., toward the (plane of the) front surface).

In some implementations, a transition surface can include a smooth and/or uniformly-applied gradient. In other implementations, a transition surface can include one or more discrete transition sections. For example, in some implementations the degree of transition can be smooth and substantially uniform from a first section or portion of a panel or panel assembly to another. In other implementations, the degree of transition can be non-constant (e.g., random, inconsistent, variable, etc.) and can include, for example, areas of no change, areas of slow change, and/or areas of relatively more rapid change. For instance, a panel (or surface thereof) can include a first design state (or feature) at a first section of the panel (or front surface thereof), a second design state (or feature) at a second section of the panel (or front surface thereof), a first transition surface feature providing a transition gradient between the first design state (or feature) and the second design state (or feature), a third design state (or feature) at a third section of the panel (or front surface thereof), and a second transition surface feature providing a transition gradient between the second design state (or feature) and the third design state (or feature).

A transition surface feature can be positioned on a panel such that the resulting transition effect occurs vertically, horizontally, diagonally, radially, circularly, or otherwise with respect to the panel surface. In some implementations, the transition effect can be generally linear in nature. In other implementations, the transition effect can be curved or otherwise non-linear. Accordingly, transition surface features can progress across the surface of the panel, generally, from left to right and/or right to left, top to bottom and/or bottom to top, and so forth.

The transition surface feature can include an origin point, origin line, or origin area from which the transitioning surface feature radiates. For example, a panel (e.g., a standalone panel or a panel includable in an assembly) can have a central (e.g., central-vertical) section or portion including a surface feature of relatively high complexity, texture, color, and/or other characteristic, and as the distance from the origin line increases, the complexity, texture, color, and/or other characteristic lessens or increases (e.g., according to a smooth and uniform gradient or according to some other non-uniform gradient). In other implementations, such an origin line can be located non-centrally or even on the edge of a panel or panel assembly. In addition, such an origin line can be horizontal, angled, or even non-linear in disposition.

In some implementations, a transition surface feature extends a distance unchanged (e.g., substantially uniform in character and/or appearance) before any transitioning effect begins. Additionally, in some implementations, a transition surface feature can extend unchanged (e.g., substantially uniform in character and/or appearance) after a transition effect. For example, a panel or panel assembly can have a first non-transitioning portion including a surface feature substantially of a first type, and a second non-transitioning portion including a surface feature substantially of a second type. Intermediate to the first and second portions is a transition portion which transitions between the first type and second type of surface features. Other implementations can include yet additional portions, surface feature types, and transition portions.

In some implementations, the portions of a panel or panel assembly that are non-transitioning in nature (e.g., without a substantial transition surface feature gradient) can make up about 10% to about 90%, about 20% to about 80%, about 30% to about 70%, about 40% to about 60%, or about 50% (or at least about 30%, 40%, 50% or 60%), or any percent or range of percentages therebetween, of the surface of the panel or panel assembly. Similarly, in some implementations, the transitioning portions of a panel or panel assembly (e.g., with a transition surface feature gradient) can make up about 10% to about 90%, about 20% to about 80%, about 30% to about 70%, about 40% to about 60%, or about 50% (or at least about 10%, 20%, 30%, or 40%), or any percent or range of percentages therebetween, of the surface of the panel or panel assembly.

Certain implementations include a transition surface feature that loses detail as it passes through the transition gradient. Other implementations include a transition surface feature that increases in detail as it passes through the transition gradient. Certain implementations include a transition surface feature wherein the proportion of the surface being texturized is reduced as the transition surface feature passes through the at least one transition gradient. Other implementations include a transition surface feature wherein the proportion of the surface being texturized is increased as the transition surface feature passes through the at least one transition gradient.

In certain implementations, the first surface feature type is a texturized surface, and the second surface feature type is a substantially blank surface. In other implementations, the first surface feature type is a substantially blank surface and the second surface feature type is a texturized surface. In still other implementations, the first surface feature type is a first texturized surface, and the second surface feature type is a second texturized surface. In each case, the transition surface feature can provide a progressive and/or gradual transition (or gradient) between the first surface feature type and the second surface feature type.

Turning now to the figures, FIG. 1 illustrates an example of an illustrative transition panel 10 including a front display surface 12 extending between and/or bound by a left surface edge 14, a right surface edge 16 opposite left surface edge 14, a lower surface edge 18, and an upper surface edge 20 opposite lower surface edge 18. Panel 10 also includes a rear surface (not shown) opposite front display surface 12.

Panel 10 can be formed and/or comprised of one or more polymeric materials and can have any suitable thickness (T) between the rear surface (not shown) and front display surface 12. For instance, panel 10 can have a thickness (T)

between about 1 mm and about 1 m, in certain implementations. In at least one implementation, panel 10 can have a thickness (T) between about 1 cm and about 50 cm, between about 2 cm and about 25 cm, or between about 2.5 cm and about 10 cm, or any value or range of values therebetween. Panel 10 can also any suitable height (H) and/or width (W), such as between about 5 cm and about 10 m, between about 50 cm and about 5 m, or between about 1 m and about 3 m, or any value or range of values therebetween.

Panel 10 also has a transition surface feature 36 disposed on (at least a portion of) front surface 12. Panel 10, or front surface 12 thereof, has a first section 22 with a first design or surface feature 24 disposed thereon. First surface feature 24 comprises a first surface texturing or design pattern. Specifically, surface feature 24 comprises a plurality of vertically-arranged (e.g., stacked), recessed trenches 26 extending horizontally across first section 22 (from left surface edge 14 towards right surface edge 16) in an alternating diagonal manner (resembling a herringbone pattern). Surface feature 34, on the other hand, can be substantially devoid of trenches 26. Each recessed trench 26 has one or more (e.g., opposing) ledges 28, which can be substantially (planar) aligned with surface 12. Adjacent trenches 26 can also share a common ledge 28 therebetween. In the depicted implementation, trenches 26 are stacked without any substantial surface plateau disposed therebetween. In addition, trenches 26 are stacked from (near or adjacent) top surface edge 20 continuously to (near or adjacent) bottom surface edge 18. It will be appreciate, however, that in other implementations, trenches 26 can be stacked with a plateau disposed therebetween and/or without approaching or extending (near or adjacent) to top surface edge 20 and/or bottom surface edge 18.

Panel 10, or front surface 12 thereof, also has a second section 30 with a second design or surface feature 32 disposed thereon. Second surface feature 32 comprises a second surface texturing or design pattern. Specifically, surface feature 32 comprises a substantially blank, smooth, and/or untextured surface design in the depicted implementation. It will be appreciated, however, that second surface feature 32 can comprise a different, second type of texturing or texturing pattern in certain implementations. Surface feature 32 extends across second section 30 (from right surface edge 16 towards left surface edge 14).

In the depicted implementation, first section 22 is disposed at or adjacent to left surface edge 14 (and extends, substantially, from lower surface edge 18 to upper surface edge 20). Similarly, second section 30 is disposed at or adjacent to right surface edge 16 (and extends, substantially, from lower surface edge 18 to upper surface edge 20). It will be appreciated, however the first section 22 and/or second section 30 need not originate, extend, or be disposed at or adjacent to any particular surface edge. Rather, first section 22 and/or second section 30 can originate, extend, or be disposed at or adjacent to any suitable portion of panel 10 and/or front surface 12 thereof. Moreover, additional sections can also be disposed and/or defined on panel 10 and/or front surface 12 thereof.

Transition surface feature 36 (further) comprises and/or provides a transition gradient 42 between first surface feature 24 and second surface feature 32 (thereof). In at least one implementation, transition surface feature 36 progressively changes from a first transition state 38 (e.g., at (or adjacent) first section 22 of panel 10) to a second transition state 40 (e.g., at (or adjacent) second section 30 of panel 10) by passing through transition gradient 42. Accordingly, transition surface feature 36 (or transition gradient 42 thereof) can be disposed between first section 22 and second section 30 and/or comprise first transition state 38 and second transition state 40. Thus, transition surface feature 36 can be configured to progressively change (e.g., transition or fade) from first state 38 at or adjacent first section 22 of the panel 10 (or front surface 12 thereof) to second state 40 at second section 30 of the panel 10 (or front surface 12 thereof) by passing through at least one surface feature transition gradient 42.

Transition surface feature 36 (or transition gradient 42 thereof) can also include at least one additional (e.g., third) transition state 44 (disposed between first state 38 and second state 40). In at least one implementation, additional (e.g., third) state 44 can comprise and/or provide a transition gradient 42 between first state 38 and second state 40.

In certain implementations, first state 38 can be the same as or substantially similar to first surface feature 24 and second state 40 can be the same as or substantially similar to second surface feature 32. Alternatively, first state 38 can be or comprise a first progressive degree of change that reduces the prevalence or proportion of first surface feature 24 and, optionally, increases the prevalence or proportion of second surface feature 32, and second state 40 can be or comprise a first progressive degree of change that increases the prevalence or proportion of second surface feature 32 and, optionally, reduces the prevalence or proportion of first surface feature 24. Accordingly, a first portion of transition surface feature 36 (or first state 38 thereof) can be disposed in first section 22 and a second portion of transition surface feature 36 (or second state 40 thereof) can be disposed in second section 30.

In some implementations, trenches 26 of first surface feature 24 can have an average depth (below surface 12 and/or ledge 28) and/or width (between ledges 28). Transition surface feature 36 (or transition gradient 42 thereof) can progressively reduce the average depth and/or width (of trenches 26) as transition surface feature 36 progresses through transition gradient 42 (e.g., from first section 22 or first state 38 to or towards second section 30 or second state 40). For instance, in some implementations, first state 38 can have an average depth and/or width that is less than the average depth and/or width of trenches 26. Specifically, first state 38 can comprise a set of smaller trenches having an average depth and/or width that is less than the average depth and/or width of trenches 26. Similarly, third state 44 can have an average depth and/or width that is less than the average depth and/or width of first state 38 and/or can comprise a set of even smaller trenches having an average depth and/or width that is less than the average depth and/or width of the smaller trenches of first state 38. Likewise, second state 40 can have an average depth and/or width that is less than the average depth and/or width of third state 44 and/or can comprise a set of still smaller trenches having an average depth and/or width that is less than the average depth and/or width of the even smaller trenches of third state 44.

In certain implementations, the depth and/or width of (each of) the smaller trenches of transition surface feature 36 (or transition gradient 42 thereof) can be progressively or gradually reduced as transition surface feature 36 (or transition gradient 42 thereof) progresses or passes from first section 22 to or towards second section 30. For instance, the depth and/or width of the smaller trenches of first state 38 can be progressively or gradually reduced as the smaller trenches progress or pass from left to right (i.e., from first section 22 to or towards third state 44). Similarly, the depth and/or width of the even smaller trenches of third state 44 can be progressively or gradually reduced as the even smaller trenches progress or pass from left to right (i.e., from first state 38 to or towards second state 30). Likewise, the depth and/or width of the still smaller trenches of second state 40 can be progressively or gradually reduced as the still smaller trenches progress or pass from left to right (i.e., from third state 44 to or towards second section 30). In at least one implementation, the depth and/or width of the trenches of second state 40 can reach or approach zero (or the depth of surface 12) at the far right end of second state 40 and/or at second section 30.

In some implementations, transition surface feature 36 can comprise surface feature 24, transition gradient 42 (or first state 38, second state 40, and third state 42 thereof) and, optionally, surface feature 34. Thus, in at least one implementation, transition surface feature 36 can originate at left surface edge 14 as surface feature 24 (e.g., comprising trenches 26 having a maximal depth and/or width) and, moving horizontally toward right surface edge 16, reaches transition gradient 42 (or first state 38 thereof). Transition gradient 42 (or first state 38, second state 40, and third state 42, thereof) provides and/or effectuates a progressive change (e.g., transition or fade) from surface feature 24 to (a generally or substantially blank, smooth, and/or untextured) surface feature 34, as described above.

In the illustrated implementation, the surface features each extending from the top to the bottom of panel 10. Moreover, moving (horizontally) across surface 12 (away from the side edges), surface features 24 and 34 each remain substantially uniform for a first distance before a transitioning effect is observed (i.e., before transition gradient 42 is reached or encountered). Specifically, surface feature 24 originates at left surface edge 14 and extends therefrom (i.e., to the right, toward right surface edge 16) a first distance of width (W) (substantially unchanged) before transition gradient 42 begins. Over a second distance of width (W), transition gradient 42 gradually changes states, decreasing the level of texturing (or becoming smoother), until transition gradient 42 reaches the smooth design of surface feature 34, which extends a third distance of width (W) (substantially unchanged) to right surface edge 16 of surface 12. Thus, one or more surface features can extend a certain distance across (width (W), height (H), etc. of) surface 12 before beginning to transition. Alternative transition surface features can have a different orientations or directions (e.g., vertical, diagonal, radial, circular, non-linear, etc.), can have different origins or position (e.g., top, bottom, centered, off-center, etc.), can have more gradual or less gradual transition gradient (with more or fewer transition states), and/or can cover a different area and/or proportion of the panel.

In alternative implementations, stacked, recessed trenches 26 can be replaced with a geometric or other pattern, printed or otherwise disposed on or extending from upper surface 12, and that gradually transitions or fades into a generally smooth or blank surface by means of transition gradient 42. As described in further detail below, a variety of other surface features, textures, shapes, patterns, designs, geometric or other shapes, arrays, and/or other arrangements can be additionally or alternatively used in transition panels (or panel assemblies or kits).

Figure 2:
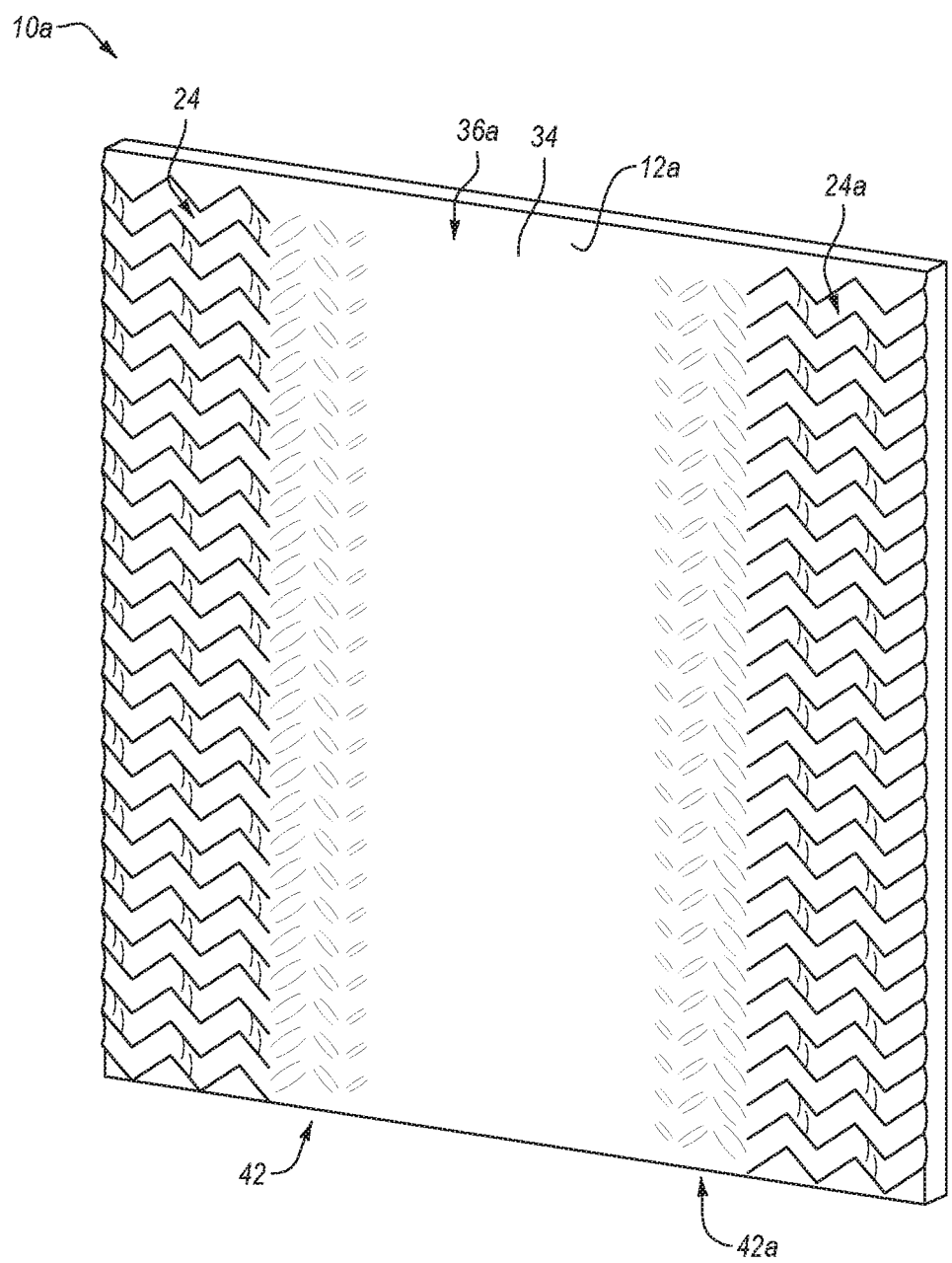

FIG. 2 illustrates another implementation of a transition panel 10*a* having a front surface 12*a* and a transition surface feature 36*a* disposed on at least a portion of front surface 12*a*. Unlike panel 10, panel 10*a* comprises two transition gradients 42, 42*a*. Panel 10*a* has two similar or substantially identical (textured) surface features 24, 24*a*, which originate and/or are disposed, respectively, at opposing side surface edges or ends of panel 10*a* and a (generally or substantially blank, smooth, and/or untextured) surface feature 34 originating and/or disposed at the center of panel 10*a*, with respective transition gradients 42, 42*a* disposed therebetween. Thus, opposing textured surface features 24, 24*a* originate and/or are disposed, respectively, at opposing side surface edges or ends of panel 10*a* and, moving horizontally toward the center of panel 10*a*, each transition into generally or substantially blank, smooth, and/or untextured surface feature 34, as described previously, by means of opposing transition gradients 42, 42*a*. Stated another way, transition surface feature 36*a* comprises generally or substantially blank, smooth, and/or untextured surface feature 34 originating at the center of panel 10*a* which, moving horizontally outward toward the edges thereof, transitions into opposing surface features 24, 24*a* by means of opposing transition gradients 42, 42*a*.

As described above, opposing surface features 24, 24*a* are substantially the same. It will be appreciated, however, that surface feature 24*a* can be substantially different from surface feature 24 in alternative implementations. For instance, in at least one implementation, surface feature 24 can include or have a first (textured) surface design or pattern, and surface feature 24*a* can include or have a second (textured or generally or substantially blank, smooth, and/or untextured) surface design or pattern. Accordingly, transition gradient 42*a* can be configured to progressively change from surface feature 24*a* to surface feature 34.

Figure 3:
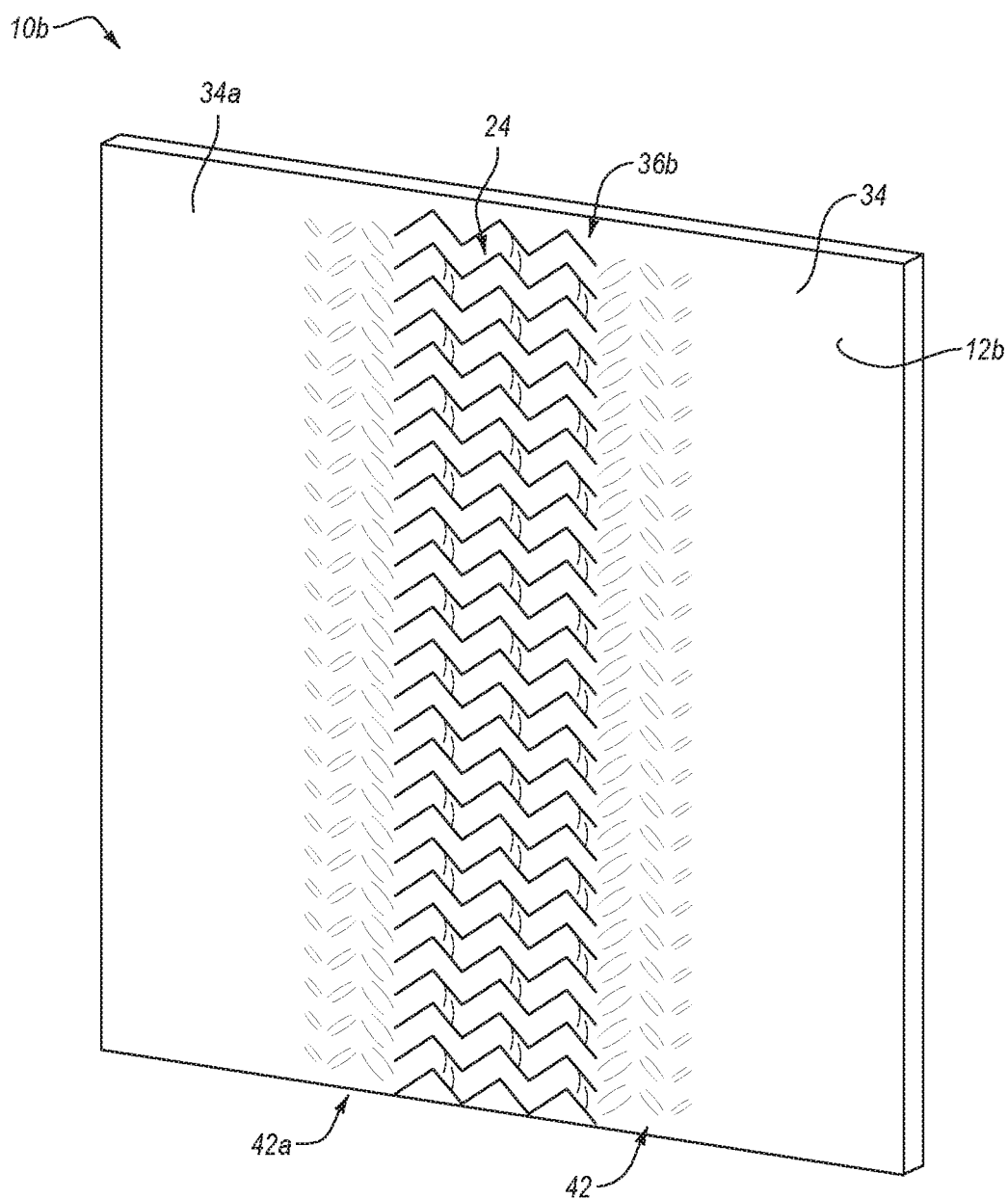

FIG. 3 illustrates another implementation of a transition panel 10*b* having a front surface 12*b* and a transition surface feature 36*b* disposed on at least a portion of front surface 12*b*. Like panel 10*a*, panel 10*b* comprises two transition gradients 42, 42*a*. However, unlike panel 10*a*, panel 10*b* has two similar or substantially identical, opposing (generally or substantially blank, smooth, and/or untextured) surface features 34, 34*a*, which originate and/or are disposed, respectively, at opposing side surface edges or ends of panel 106*b* and a (textured) surface feature 24, originating and/or disposed at the center of panel 10*b*, with respective transition gradients 42, 42*a* disposed therebetween. Thus, opposing, generally or substantially blank, smooth, and/or untextured surface features 34, 34*a* originate and/or are disposed, respectively, at opposing side surface edges or ends of panel 10*b* and, moving horizontally toward the center of panel 10*b*, each transition into opposing textured surface features 24, as described previously, by means of opposing transition gradients 42, 42*a*. Stated another way, transition surface feature 36*b* comprises textured surface feature 24 originating at the center of panel 10*b* which, moving horizontally outward toward the edges thereof, transitions into opposing, generally or substantially blank, smooth, and/or untextured surface features 34, 34*a* by means of opposing transition gradients 42, 42*a*.

As described above, opposing surface features 34, 34*a* are substantially the same. It will be appreciated, however, that surface feature 34*a* can be substantially different from surface feature 34 in alternative implementations. For instance, in at least one implementation, surface feature 34 can include or have a first (generally or substantially blank, smooth, and/or untextured) surface design or pattern, and surface feature 34*a* can include or have a second (textured or generally or substantially blank, smooth, and/or untextured) surface design or pattern. Accordingly, transition gradient 42*a* can be configured to progressively change from surface feature 34*a* to surface feature 24.

Figure 4:
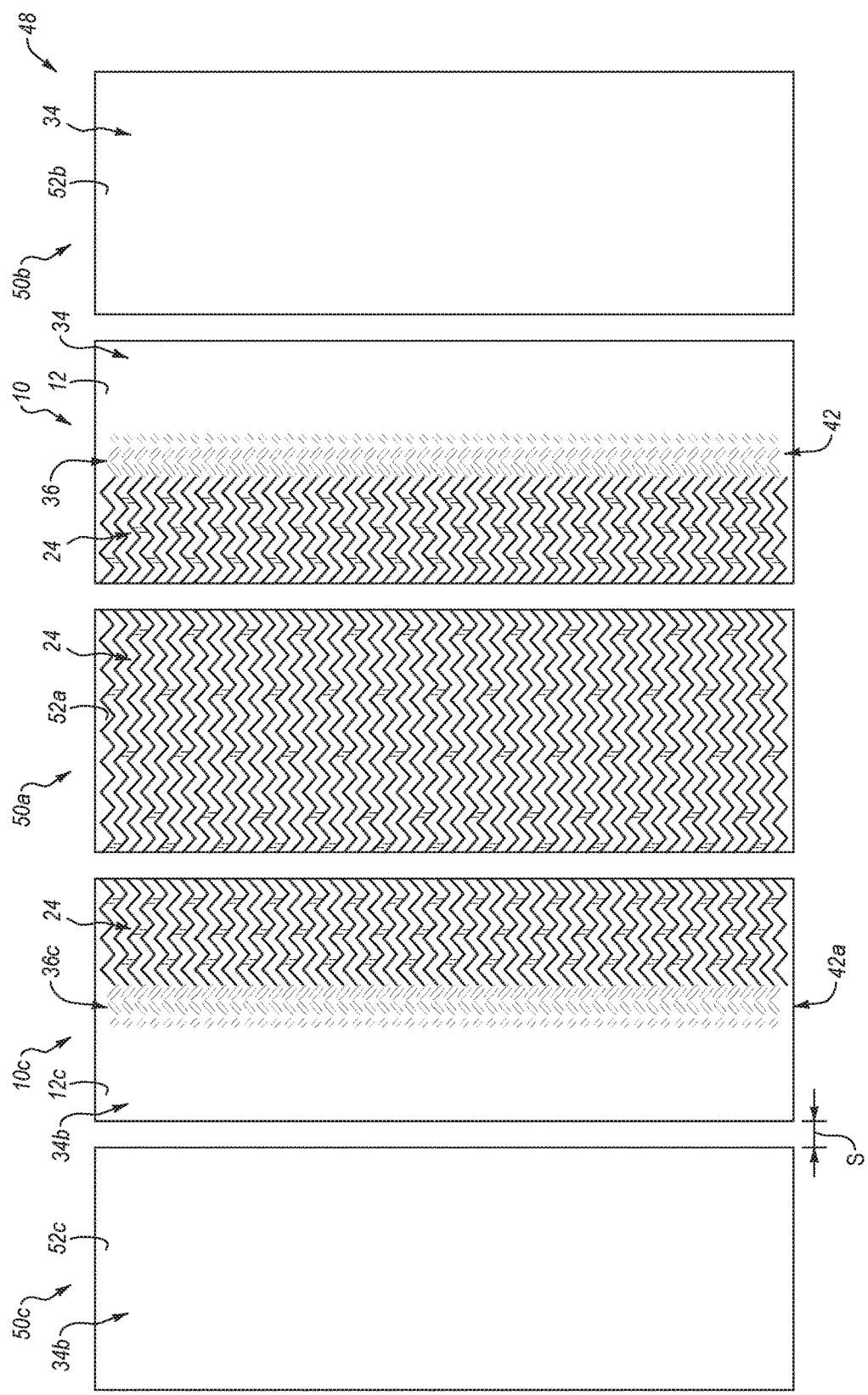
FIG. 4 illustrates a facing view of a panel assembly in accordance with an implementation of the present disclosure.

FIG. 4 illustrates a panel assembly (or kit) 48 comprising a first (non-transition) panel 50a having a first front surface 52a and a first surface feature type 24 (comprising a first (textured) surface texturing pattern) disposed on at least a portion of first front surface 52a, a second (non-transition) panel 50b having a second front surface 52b and a second surface feature type 34 (comprising a second (generally or substantially blank, smooth, and/or untextured) surface texturing pattern disposed on at least a portion of second front surface 52b, and a first transition panel 10 positioned (or positionable) between first panel 50a and second panel 50b. First transition panel 10 has a third front surface 12 and a first transition surface feature 36 disposed on at least a portion of third front surface 12. As described above, first transition surface feature 36 comprises and/or provides a first transition gradient 42 between first surface feature type 24 and second surface feature type 34 or progressively changing from first surface feature type 24 to second surface feature type 34 by passing through first transition gradient 42.

As depicted, a proportion of the first surface texturing pattern to the second surface texturing pattern is reduced as the transition surface feature progresses through first transition gradient 42. Moreover, as described above, the first surface texturing pattern has an average texturing depth. Transition surface feature 36 progressively reducing the average texturing depth as transition surface feature 36 progresses through first transition gradient 42.

In the depicted implementation, panel assembly (or kit) 48 further comprises a fourth (non-transition) panel 50c having a fourth front surface 52c and a third surface feature type 34b disposed on at least a portion of fourth front surface 52c, and a second transition panel 10c positioned (or positionable) between first panel 50a and fourth panel 50c. Second transition panel 10c has a fifth front surface 12c and a second transition surface feature 36c disposed on at least a portion of third front surface 12c. Second transition surface feature 36 comprises and/or provides a second transition gradient 42a between first surface feature type 24 and second surface feature type 34b or progressively changes from first surface feature type 24 to second surface feature type 34b by passing through first transition gradient 42a. In at least one implementation, second transition panel 10c can be a mirror image of the first transition panel 10.

In the depicted implementation, second and third surface feature types 34, 34b are substantially the same. It will be appreciated, however, that second surface feature type 34 can be substantially different from the third surface feature type 34b in alternative implementations. For instance, in at least one implementation, surface feature 34 can include or have a first (generally or substantially blank, smooth, and/or untextured) surface design or pattern, and surface feature 34b can include or have a second (textured or generally or substantially blank, smooth, and/or untextured) surface design or pattern. Accordingly, transition gradient 42a can be configured to progressively change from surface feature 34b to surface feature 24.

In this implementation, the panel assembly includes a first non-transitioning panel having a surface feature of a first type (which, in this implementation, is a textured surface), a pair of second non-transitioning panels having surface features of a second type (which, in this implementation, is a non-textured surface), and a pair of transitioning panels positionable between the different types of non-transitioning panels so as to create the transitioning effect when the panels are assembled together.

In other implementations, a different number and/or configuration of panels can be utilized to form the panel assembly. For example, some implementations can include more than one non-transitioning panel of the first type and additional transition panels, such that the overall transition surface feature of the panel assembly includes a transition from a first type of surface to a second and then back to the first. In some implementations, the number and configuration of panels can be altered so as to provide an overall transition surface feature that transitions from a first type of surface to a second type of surface to a third type, and optionally to any other number of types or back to any of the previous types.

Moreover, in the depicted implementation, panels 50a, 10, 50b, 10c, and 50c are separated, respectively, by a space (S). It will be appreciated, however, that panels 50a, 10, 50b, 10c, and 50c can be aligned and/or touching, staggered, overlapping, or otherwise configured without necessarily departing from the scope of this disclosure.

Figure 5:
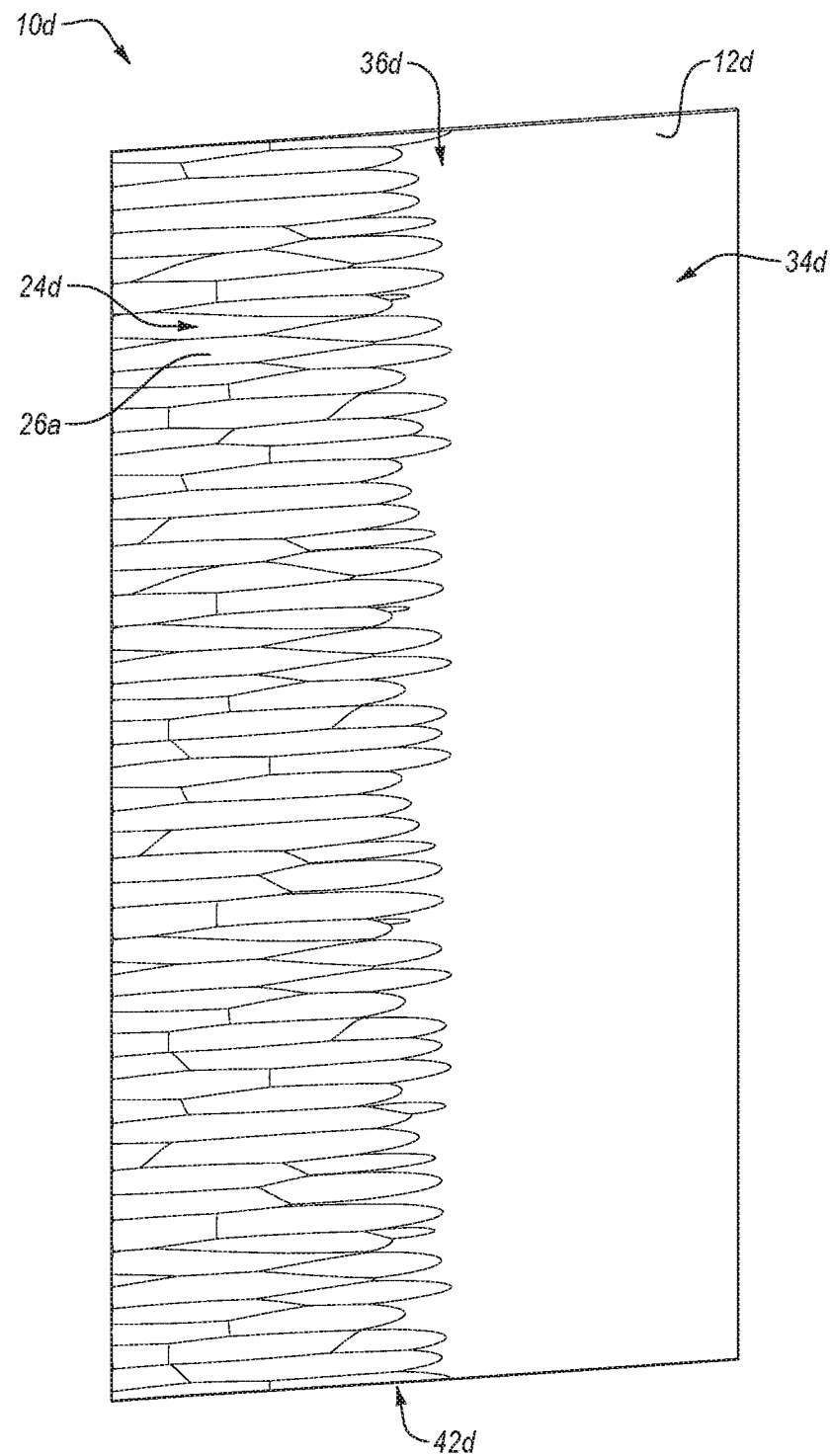
FIG. 5 illustrates a perspective view of a panel having a transition surface feature in accordance with still another implementation of the present disclosure.

As indicated above, a variety of other surface features, textures, shapes, patterns, designs, geometric or other shapes, arrays, and/or other arrangements can be additionally or alternatively used in transition panels (or panel assemblies or kits). For instance, FIG. 5 illustrates an alternative transition panel 10d having a front surface 12d and a transition surface feature 36d disposed on at least a portion of front surface 12d. Panel 10d (or transition surface feature 36d thereof) comprises or has a (textured) surface features 24d, which originate and/or is disposed at a left side surface edge of panel 10d, a (generally or substantially blank, smooth, and/or untextured) surface feature 34d originating and/or disposed at a left side surface edge of panel 10d, and a transition gradient 42d disposed therebetween. Surface features 24d can comprise recessed trenches 26a extending horizontally across a first portion of surface 12d (from left to right). Surface feature 34d can be substantially devoid of trenches 26a. Transition gradient 42d can comprise the progressive and/or gradual reduction in the number, density, prevalence, or proportion of trenches 26a (or surface features 24d) as transition gradient 42d progresses from surface features 24d to surface features 34d (or from left to right).

Figure 6:
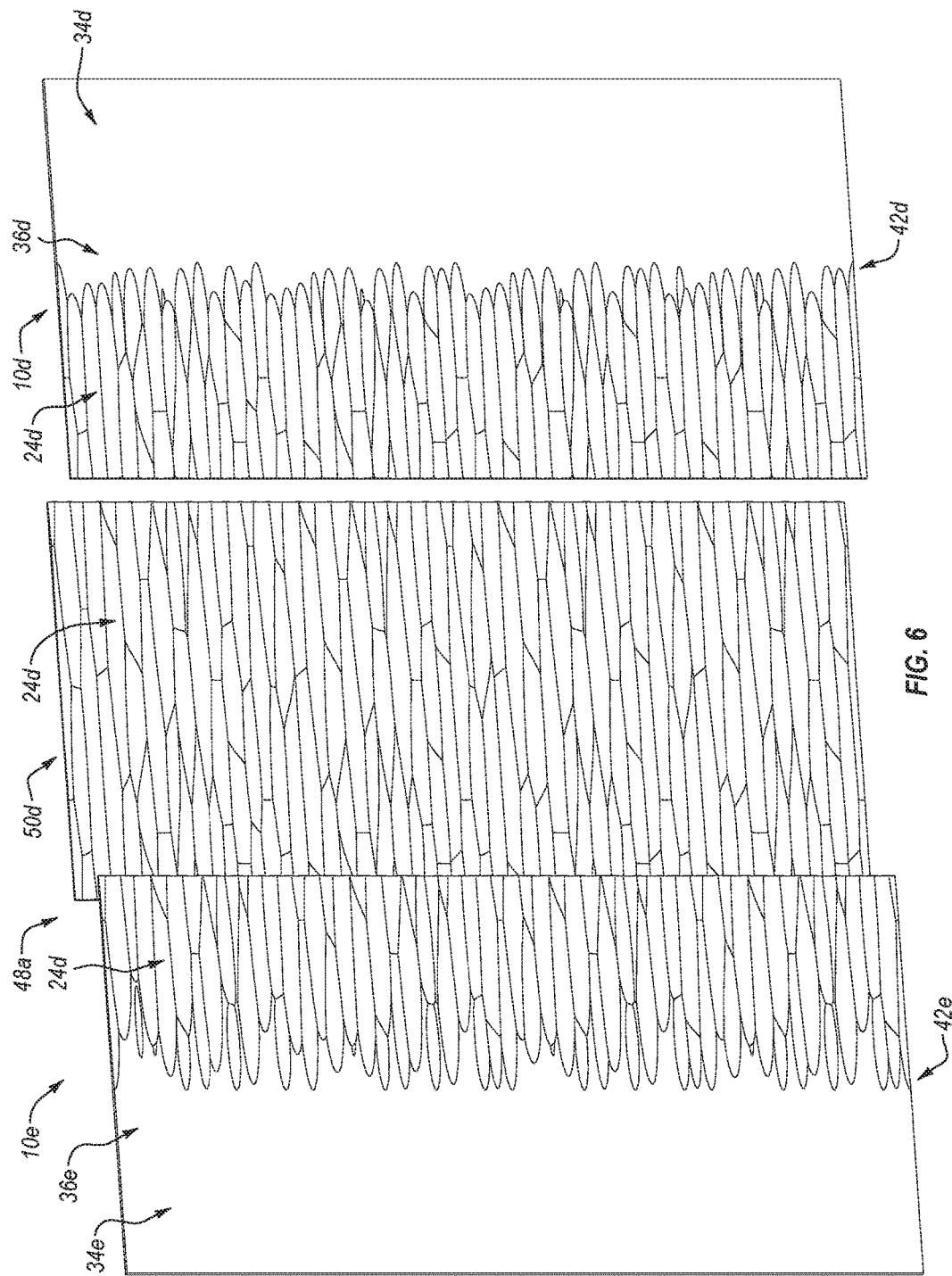
FIG. 6 illustrates a perspective view of a panel assembly incorporating the panel of FIG. 5 in accordance with an implementation of the present disclosure.

As depicted in FIG. 6, transition panel 10d can also be incorporated into a panel assembly 48a, which also comprises a (mirror-image) transition panel 10e, having a transition surface feature 36e, (and) comprising a surface feature 24d, a surface feature 34e, and a transition gradient 42e disposed therebetween, and a (non-transition) panel 50d, having a surface feature 24d, disposed therebetween.

Figure 7:
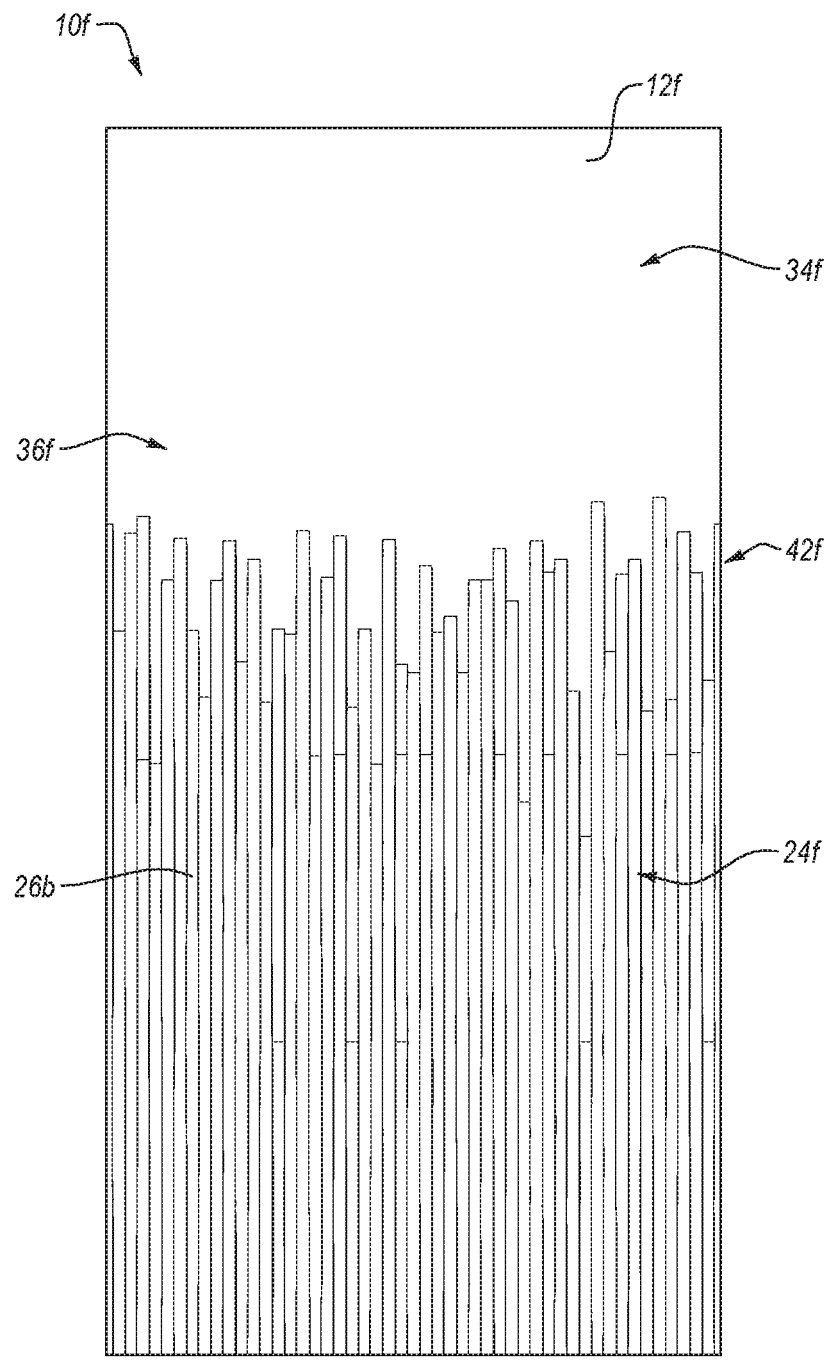
FIG. 7 illustrates a facing view of a panel having a transition surface feature in accordance with still another implementation of the present disclosure.

FIG. 7 illustrates another implementation of an alternative transition panel 10f, having a front surface 12f and a transition surface feature 36f disposed on at least a portion of front surface 12f. Panel 10f (or transition surface feature 36f thereof) comprises or has a (textured) surface feature 24f, which originates and/or is disposed at a bottom surface edge of panel 10f, a (generally or substantially blank, smooth, and/or untextured) surface feature 34f originating and/or disposed at a top surface edge of panel 10f, and a transition gradient 42f disposed therebetween. Surface feature 24f can comprise recessed trenches 26b extending vertically across a first portion of surface 12f (from bottom to top). Surface feature 34f can be substantially devoid of trenches 26b. Transition gradient 42f can comprise the progressive and/or gradual reduction in the number, density, prevalence, or proportion of trenches 26b (or surface feature 24f) as transition gradient 42f progresses from surface feature 24f to surface feature 34f (or from bottom to top).

Figure 8:
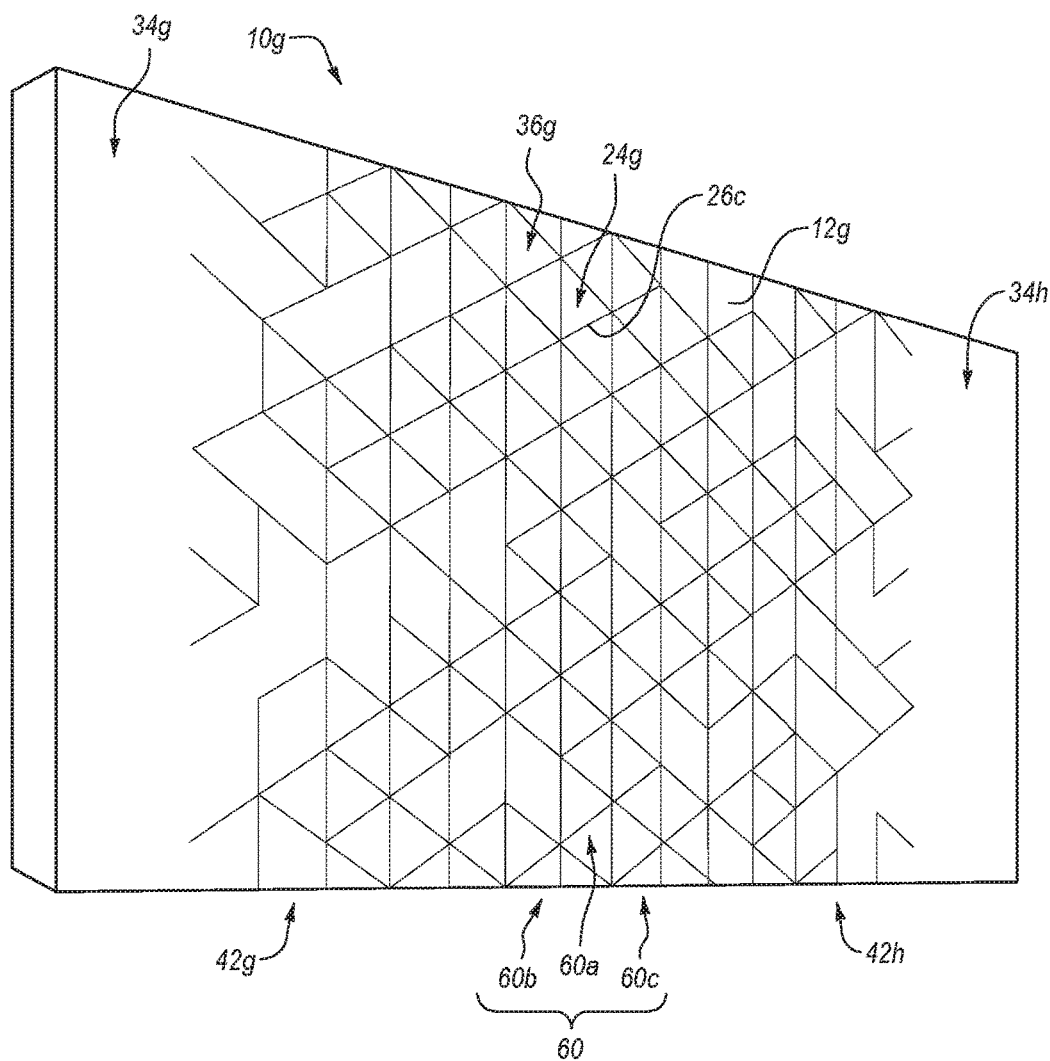
FIG. 8 illustrates a perspective view of a panel having a transition surface feature in accordance with still another implementation of the present disclosure.

FIG. 8 illustrates another implementation of an alternative transition panel 10g having a front surface 12g and a transition surface feature 36g disposed on at least a portion of front surface 12g. Panel 10g (or transition surface feature 36g thereof) comprises or has a (textured) surface features 24g, which originates and/or is disposed the middle of panel 10g, opposing (generally or substantially blank, smooth, and/or untextured) surface feature 34g, 34h originating and/or disposed at opposing side surface edges of panel 10g, and opposing transition gradients 42g, 42h disposed therebetween. Surface feature 24g can comprise recessed trenches (or scorings) 26c extending vertically and diagonally crossways across a middle portion of surface 12g. Surface features 34g, 34h can be substantially devoid of trenches 26c. Transition gradients 42g, 42h can comprise the progressive and/or gradual reduction in the number, density, prevalence, or proportion of trenches (or scorings) 26c (or surface features 24g) as transition gradients 42g, 42h progresses from surface feature 24g to surface features 34h (or from middle to edges).

It will also be appreciated that transition surface feature 36g can comprise a geometric line pattern formed as a series or array of columns 60, that originate as a complex pattern in a central column 60a and, moving horizontally outward, transitions through a series of less complex columns 60b, 60c, etc., and, eventually, into a blank surface as transition surface feature 36g becomes progressively less complex and loses detail.

Figure 9:
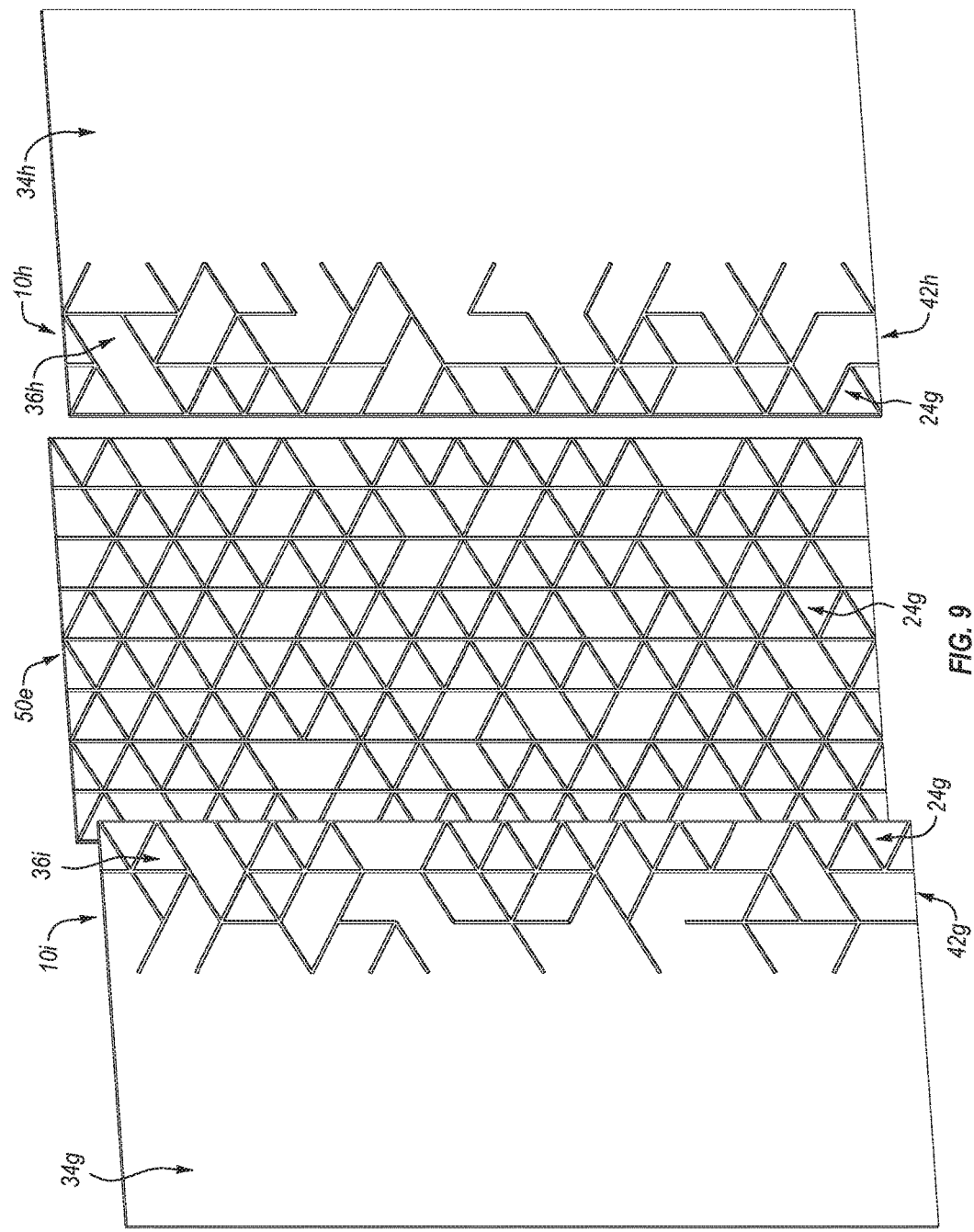
FIG. 9 illustrates a perspective view of a panel assembly incorporating panels having a transition surface feature in accordance with another implementation of the present disclosure.

As depicted in FIG. 9, a similar configuration can be incorporated into a panel assembly (or kit) 48b, which comprises (mirror-image) transition panels 10h, 10i, having transition surface features 36h, 36i, (and) comprising surface features 24g, surface features 34g, 34h, and transition gradients 42g, 42h disposed therebetween, and a (non-transition) panel 50e, having surface feature 24g, disposed therebetween. Panels 10h, 50e, and 10i are disposed in a staggered relationship in the illustrated implementation. Moreover, at least panel 10i has an opaque configuration in the illustrated implementation. As indicated above, however, panels can also be non-opaque (transparent or translucent) and/or comprise non-opaque configurations. In addition, panels in a panel assembly can be arranged in any suitable relationship without necessarily departing from the scope of this disclosure.

Figure 10A:
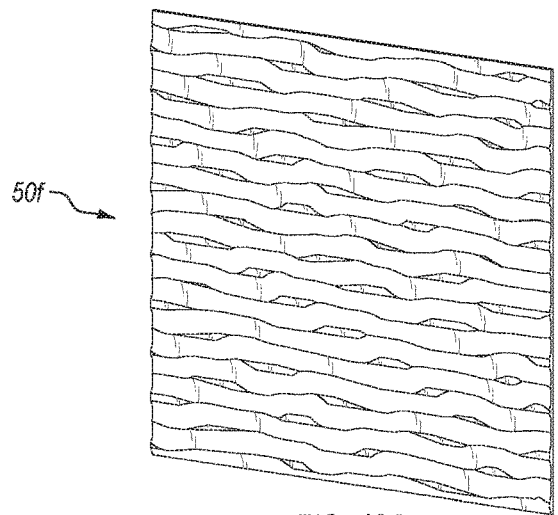
FIGS. 10A-10C each illustrate a perspective view of a panel in accordance with an implementation of the present disclosure.
Figure 10B:
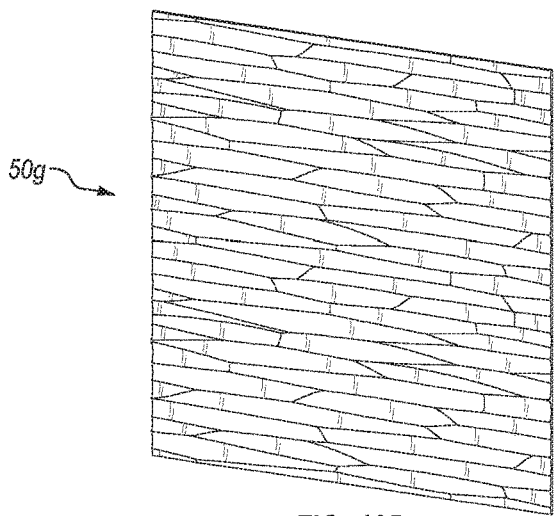
Figure 10C:
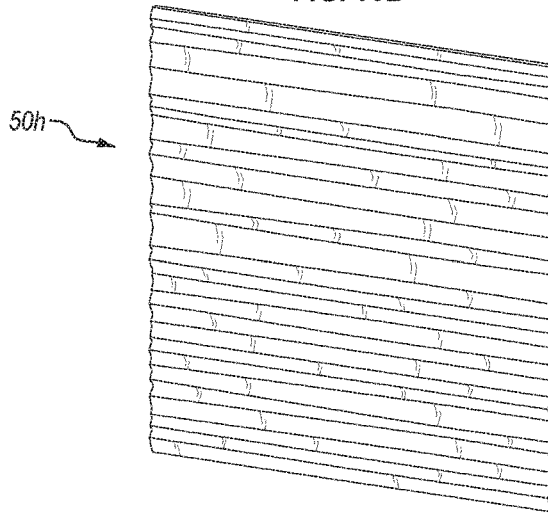
Figure 11A:
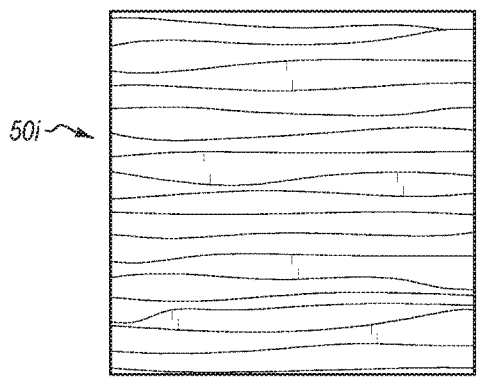
FIGS. 11A-11H each illustrate a facing view of a panel in accordance with an implementation of the present disclosure.
Figure 11B:
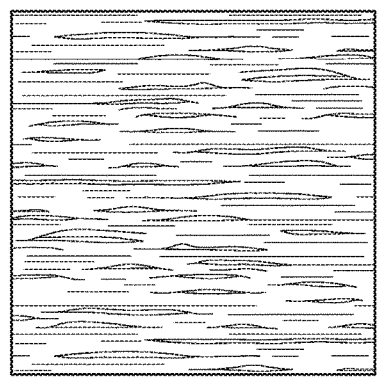
Figure 11C:
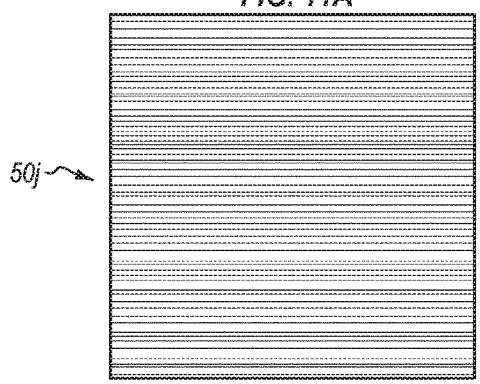
Figure 11D:
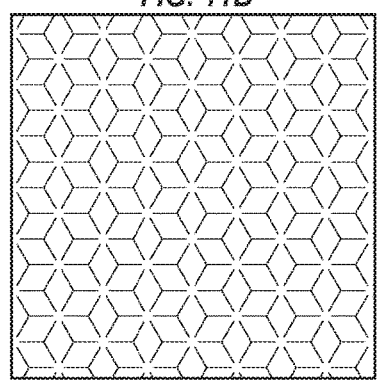
Figure 11E:
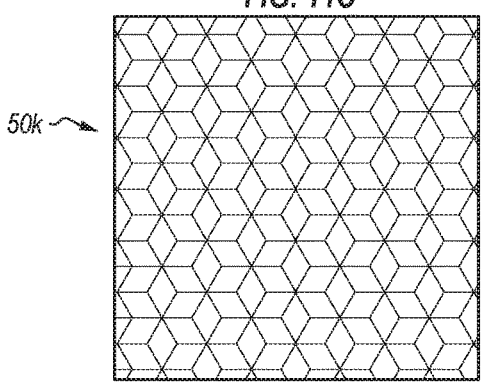
Figure 11F:
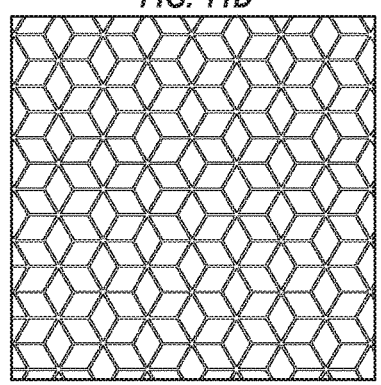
Figure 11G:
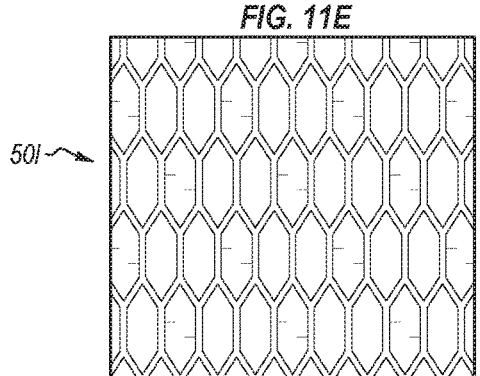
Figure 11H:
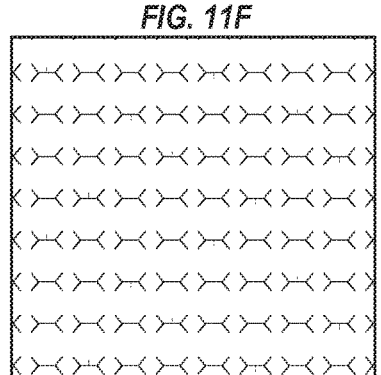

FIGS. 10A-10C illustrate perspective views of additional (non-transition) panels 50f, 50g, and 50h, respectively, which each have surface feature types that can be incorporated into transition panels as described herein.

FIGS. 11A-11H illustrate facing views of additional (non-transition) panels 50i, 50j, 50k, 50l, 50m, 50n, 50o, and 50p, respectively, which each have surface feature types that can be incorporated into transition panels as described herein.

Various alterations and/or modifications of the inventive features illustrated herein, and additional applications of the principles illustrated herein, which would occur to one skilled in the relevant art and having possession of this disclosure, can be made to the illustrated implementations without departing from the spirit and scope of the invention as defined by the claims, and are to be considered within the scope of this disclosure. Thus, while various aspects and implementations have been disclosed herein, other aspects and implementations are contemplated. While a number of methods and components similar or equivalent to those described herein can be used to practice implementations of the present disclosure, only certain components and methods are described herein.

It will also be appreciated that systems, processes, and/or products according to certain implementations of the present disclosure may include, incorporate, or otherwise comprise properties features (e.g., components, members, elements, parts, and/or portions) described in other implementations disclosed and/or described herein. Accordingly, the various features of certain implementations can be compatible with, combined with, included in, and/or incorporated into other implementations of the present disclosure. Thus, disclosure of certain features relative to a specific implementation of the present disclosure should not be construed as limiting application or inclusion of said features to the specific implementation. Rather, it will be appreciated that other implementations can also include said features without necessarily departing from the scope of the present disclosure. Moreover, unless a feature is described as requiring another feature in combination therewith, any feature herein may be combined with any other feature of a same or different implementation disclosed herein. Furthermore, various well-known aspects of illustrative systems, processes, products, and the like are not described herein in particular detail in order to avoid obscuring aspects of the example implementations. Such aspects are, however, also contemplated herein.

The present disclosure may be embodied in other specific forms without departing from its spirit or essential characteristics. The described implementations are to be considered in all respects only as illustrative and not restrictive. The scope of the invention is, therefore, indicated by the appended claims rather than by the foregoing description. Each of the appended claims, as well as the recited elements thereof, is intended to be combinable with any other claim(s) and/or element(s) in any suitable combination or dependency without regard to the dependency in which said claims are presented. While certain implementations and details have been included herein and in the attached disclosure for purposes of illustrating implementations of the present disclosure, it will be apparent to those skilled in the art that various changes in the methods and apparatus disclosed herein may be made without departing from the scope of the invention, which is defined in the appended claims. All changes which come within the meaning and range of equivalency of the claims are to be embraced within their scope.

I claim:

1. A multi-panel architectural assembly, comprising:
a first panel having a first front surface and a first surface feature type disposed on at least a portion of the first front surface;
a second panel having a second front surface and a second surface feature type disposed on at least a portion of the second front surface,
wherein the first surface feature type or the second surface feature type comprises a substantially smooth or blank surface or is substantially free of surface texturing; and
a first transition panel positionable between the first and second panels, the first transition panel having a third front surface and a first transition surface feature disposed on at least a portion of the third front surface, the first transition surface feature providing a first transition gradient between the first surface feature type and the second surface feature type or progressively changing from the first surface feature type to the second surface feature type by passing through the first transition gradient.

2. The multi-panel architectural assembly of claim 1, wherein:
the first surface feature type comprises a surface texturing pattern;
the second surface feature type comprises a substantially smooth or blank surface; and
the first transition surface feature comprises a progressive transition gradient between the surface texturing pattern and the substantially smooth or blank surface.

3. The multi-panel architectural assembly of claim 2, wherein:
the surface texturing pattern has an average complexity, the first transition surface feature progressively reducing the average complexity as the first transition surface feature progresses through the first transition gradient; or
the surface texturing pattern has an average texturing depth, the first transition surface feature progressively reducing the average texturing depth as the first transition surface feature progresses through the first transition gradient.

4. The multi-panel architectural assembly of claim 1, further comprising:
a fourth panel having a fourth front surface and a third surface feature type disposed on at least a portion of the fourth front surface; and
a second transition panel positionable between the first and fourth panels, the second transition panel having a fifth front surface and a second transition surface feature disposed on at least a portion of the fifth front surface, the second transition surface feature providing a transition gradient between the first surface feature type and the third surface feature type or progressively changing from the first surface feature type to the third surface feature type by passing through the second transition gradient.

5. The multi-panel architectural assembly of claim 4, wherein the first surface feature type comprises a first surface texturing pattern, the second surface feature type comprises a substantially smooth or blank surface, the first transition surface feature comprises a first progressive transition gradient between the first surface texturing pattern and the substantially smooth or blank surface, the third surface feature type comprises a second surface texturing pattern, and the second transition surface feature comprises a second progressive transition gradient between the first surface texturing pattern and the second surface texturing pattern.

6. The multi-panel architectural assembly of claim 4, wherein the second surface feature type and the third surface feature type are substantially the same.

7. The multi-panel architectural assembly of claim 4, wherein the third surface feature type comprises a substantially smooth or blank surface or is substantially free of surface texturing.

8. The multi-panel architectural assembly of claim 4, wherein:
the first surface feature type comprises a substantially smooth or blank surface,
the second surface feature type comprises a first surface texturing pattern,
the first transition surface feature comprises a first progressive transition gradient between the substantially smooth or blank surface and the first surface texturing pattern,
the third surface feature type comprises a second surface texturing pattern, and
the second transition surface feature comprises a second progressive transition gradient between the substantially smooth or blank surface and the second surface texturing pattern.

* * * * *